United States Patent
Koyama et al.

(10) Patent No.: US 9,313,477 B2
(45) Date of Patent: Apr. 12, 2016

(54) THREE-DIMENSIONAL VIDEO PROCESSING APPARATUS AND THREE-DIMENSIONAL VIDEO PROCESSING METHOD

(71) Applicant: PANASONIC CORPORATION, Osaka (JP)

(72) Inventors: Takayoshi Koyama, Osaka (JP); Kenjiro Tsuda, Kyoto (JP); Yoshiyuki Okimoto, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 377 days.

(21) Appl. No.: 13/889,900

(22) Filed: May 8, 2013

(65) Prior Publication Data

US 2013/0242065 A1 Sep. 19, 2013

Related U.S. Application Data

(63) Continuation of application No. PCT/JP2012/005253, filed on Aug. 22, 2012.

(30) Foreign Application Priority Data

Sep. 20, 2011 (JP) ................................. 2011-204088

(51) Int. Cl.
*H04N 13/04* (2006.01)
*H04N 5/232* (2006.01)
*H04N 13/00* (2006.01)

(52) U.S. Cl.
CPC .............. *H04N 13/04* (2013.01); *H04N 5/232* (2013.01); *H04N 13/0022* (2013.01); *H04N 13/0497* (2013.01)

(58) Field of Classification Search
CPC ..... H04N 5/232; H04N 13/04; H04N 13/0022; H04N 13/0497
See application file for complete search history.

(56) References Cited

U.S. PATENT DOCUMENTS 5,786,847 A * 7/1998 Katayama et al. .............. 348/47
6,512,892 B1 1/2003 Montgomery et al.
6,798,406 B1 9/2004 Jones et al.

(Continued)

FOREIGN PATENT DOCUMENTS

JP 08-317429 11/1996
JP 3568195 B2 9/2004

(Continued)

OTHER PUBLICATIONS

International Search Report issued in International Patent Application No. PCT/JP2012/005253 mailed on Nov. 20, 2012.

*Primary Examiner* — Brian Yenke
(74) *Attorney, Agent, or Firm* — McDermott Will & Emery LLP

(57) ABSTRACT

A three-dimensional video processing apparatus includes: a video obtaining unit which obtains a 3D video for three-dimensional viewing; a position obtaining unit which obtains a position of a first area which is an area included in a part of the 3D video; a disparity obtaining unit which obtains disparity amounts of the 3D video; a determination unit which determines a size of an enlargement area; and an area selection unit which selects, as the enlargement area, at least one second area that has disparity amounts within a predetermined range, includes the first area, and has a size determined by the determination unit.

8 Claims, 14 Drawing Sheets

(56) References Cited

U.S. PATENT DOCUMENTS

| | | |
|---|---|---|
| 7,636,088 B2 | 12/2009 | Nomura et al. |
| 7,889,196 B2 | 2/2011 | Nomura et al. |
| 8,135,270 B2 | 3/2012 | Tanaka |
| 8,379,113 B2 | 2/2013 | Nakazawa |
| 2006/0192776 A1* | 8/2006 | Nomura et al. ............... 345/419 |
| 2010/0039499 A1 | 2/2010 | Nomura et al. |
| 2010/0201789 A1* | 8/2010 | Yahagi ............................ 348/51 |
| 2011/0018969 A1* | 1/2011 | Tanaka ............................ 348/47 |
| 2011/0019989 A1 | 1/2011 | Tanaka |
| 2011/0175907 A1* | 7/2011 | Tokuda ......................... 345/419 |
| 2011/0292178 A1* | 12/2011 | Goma et al. .................... 348/46 |
| 2011/0292227 A1 | 12/2011 | Nakazawa |
| 2011/0304714 A1* | 12/2011 | Akifusa et al. ................. 348/54 |
| 2012/0011464 A1* | 1/2012 | Hayashi et al. ............... 715/784 |
| 2012/0019527 A1* | 1/2012 | Ugawa ......................... 345/419 |
| 2012/0098938 A1* | 4/2012 | Jin ................................. 348/47 |
| 2012/0108328 A1* | 5/2012 | Konno et al. ................... 463/31 |
| 2012/0133645 A1* | 5/2012 | Jung et al. .................... 345/419 |
| 2013/0009949 A1* | 1/2013 | Hewes et al. ................. 345/419 |
| 2013/0038699 A1* | 2/2013 | Hayashi ......................... 348/47 |
| 2013/0083174 A1* | 4/2013 | Sakurabu ........................ 348/51 |
| 2013/0088573 A1* | 4/2013 | Collar et al. ................... 348/46 |
| 2013/0100253 A1* | 4/2013 | Sawachi ......................... 348/47 |
| 2013/0169633 A1* | 7/2013 | Hattori et al. ................ 345/419 |
| 2015/0163475 A1* | 6/2015 | Krisman ......................... 348/51 |

FOREIGN PATENT DOCUMENTS

| | | |
|---|---|---|
| JP | 2004-349736 A | 12/2004 |
| JP | 2005-073013 A | 3/2005 |
| JP | 2005-128897 A | 5/2005 |
| JP | 2005-130313 A | 5/2005 |
| JP | 4442190 B2 | 3/2010 |
| JP | 2010-213084 A | 9/2010 |
| JP | 2011-029700 A | 2/2011 |
| JP | 2011-029905 A | 2/2011 |
| JP | 2011-176699 A | 9/2011 |

* cited by examiner

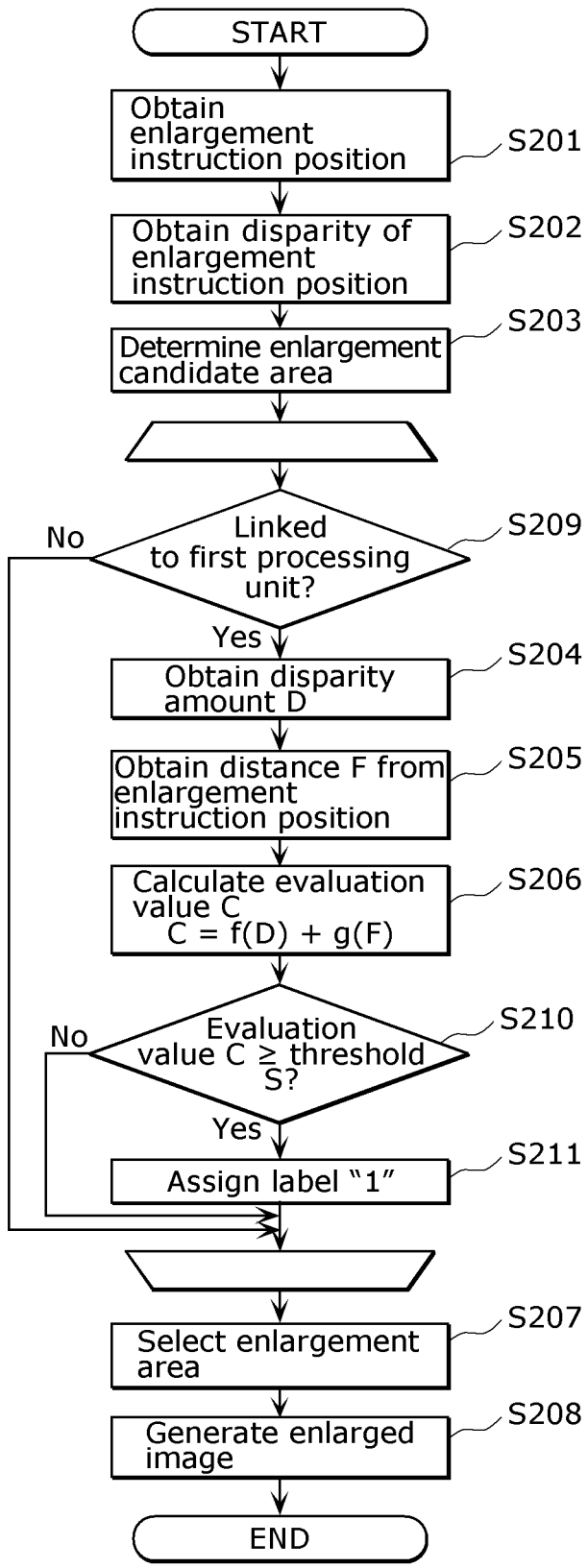

THREE-DIMENSIONAL VIDEO PROCESSING APPARATUS AND THREE-DIMENSIONAL VIDEO PROCESSING METHOD

CROSS REFERENCE TO RELATED APPLICATION

This is a continuation application of PCT International Application No. PCT/JP2012/005253 filed on Aug. 22, 2012, designating the United States of America, which is based on and claims priority of Japanese Patent Application No. 2011-204088 filed on Sep. 20, 2011. The entire disclosures of the above-identified applications, including the specifications, drawings and claims are incorporated herein by reference in their entirety.

FIELD

One or more exemplary embodiments disclosed herein relate generally to three-dimensional video processing apparatuses and three-dimensional video processing methods for displaying 3D video for three-dimensional viewing.

BACKGROUND

There is known a 3D display apparatus which can separately project a right video and a left video having disparity therebetween to the right eye and the left eye of a viewer.

A 3D display apparatus provides a three-dimensional view by causing a shift of a display position of a left-eye video and a display position of a right-eye video on the 3D display apparatus in a parallel direction. A left-eye video is shown to the left eye, while a right-eye video is shown to the right eye. If this shift (hereinafter referred to as a disparity amount) is over an appropriate range, the viewer cannot view the three-dimensional video normally. Accordingly, when generating a 3D video, the 3D display apparatus generates a left-eye video and a right-eye video in a manner that the disparity amount converges in a predetermined range.

Here, when a part of video out of the 3D video (hereinafter also referred to as a partial video) is to be enlarged, a disparity of the partial video is enlarged, which makes it impossible for the viewer to view the video normally after enlargement. In order to avoid such a problem, Patent Literature (PTL) 1 discloses a method for allowing a viewer to continuously view the three-dimensional video normally, by changing a magnification according to the disparity amount in the enlargement area.

CITATION LIST

Patent Literature

[PTL 1] Japanese Patent No. 4442190

SUMMARY

Technical Problem

One non-limiting and exemplary embodiment provides an apparatus which enlarges an area including a position desired to be enlarged, in a manner that the enlarged area can be viewed three-dimensionally without changing the magnification.

Solution to Problem

In one general aspect, the techniques disclosed here feature a three-dimensional video processing apparatus that performs processing for enlarging a part of 3D video for three-dimensional viewing displayed on a display screen by a predetermined magnification on the display screen, the apparatus including: a video obtaining unit configured to obtain the 3D video; a position obtaining unit configured to obtain a position of a first area which is an area included in the part of the 3D video; a disparity obtaining unit configured to obtain disparity amounts of the 3D video per processing unit obtained by dividing the 3D video by a predetermined number of pixels; a determination unit configured to determine a size, on the display screen, of an enlargement area based on a size of the display screen and the predetermined magnification, the enlargement area being included in the part of the 3D video; and an area selection unit configured to select, as the enlargement area, at least one of a plurality of second areas that includes processing units each having a disparity amount within a predetermined range, the second areas being included in the part of the 3D video, and each including the first area and having a size determined by the determination unit.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The three-dimensional video processing apparatus according to one or more exemplary embodiments or features disclosed herein can enlarge a video area that a viewer desires to enlarge while maintaining a magnification and limiting a disparity within a predetermined range.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 12 is a flowchart showing another example of the enlargement operation performed by the controller according to Embodiment 2.

DESCRIPTION OF EMBODIMENTS

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

The following describes the embodiments in detail with reference to the Drawings as necessary. However, description detailed beyond necessity is omitted in some cases. For example, detailed description on an already well-known matter or overlapped description on substantially the same configurations may be omitted. This is for avoiding unnecessarily redundancy in the description below, and for making it easier for those skilled in the art to understand.

It is to be noted that the inventors provides the attached Drawings and the description below to help those skilled in the art understand the present disclosure sufficiently, and therefore it should not be construed that the scope of Claims is limited to the Drawings and description.

Embodiment 1

Embodiment 1 is described below with reference to FIGS. 1 to 8. In the embodiment below, a digital camera is taken as an example.

[1-1. Configuration]

First, a configuration of a digital camera according to Embodiment 1 is described.

Figure 1:
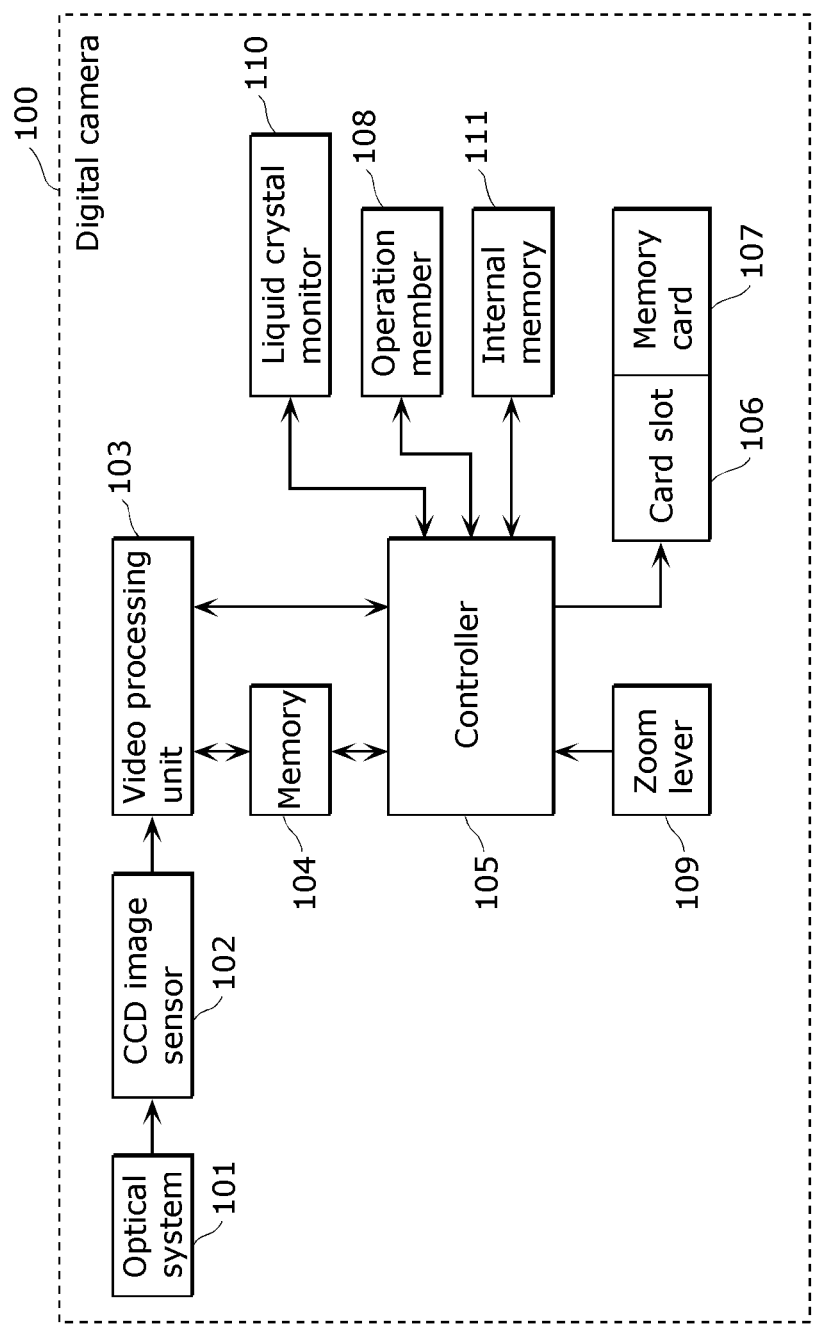
FIG. 1 is a block diagram showing a configuration of a digital camera according to Embodiment 1.

FIG. 1 is a block diagram showing the configuration of the digital camera according to Embodiment 1.

A digital camera 100 includes an optical system 101, a CCD image sensor 102, a video processing unit 103, a memory 104, a controller 105, a card slot 106, a memory card 107, an operation member 108, a zoom lever 109, a liquid crystal monitor 110, and an internal memory 111.

The optical system 101 forms a subject image of a first viewpoint that corresponds to one of the left eye image and the right eye image included in the 3D video. Furthermore, the optical system 101 forms a subject image of a second viewpoint that corresponds to the other one of the left eye image and the right eye image, which is different from the first viewpoint. Specifically, the optical system 101 includes two optical systems: a first optical system and a second optical system.

It is to be noted that the optical system 101 may be a single optical system, and may form subject images at different viewpoints depending on movement of the user to another capturing position. Specifically, the optical system 101 may be anything as long as the optical system 101 can form two subject images which are different from each other and for use in a 3D video. It is to be noted that the optical system 101 includes a zoom lens (not shown), an optical image stabilizer (OIS) (not shown), and a focus lens (not shown).

The CCD image sensor 102 captures a subject image formed by the optical system 101, to generate a video signal. When a subject image of the first viewpoint is inputted from the optical system 101, the CCD image sensor 102 generates a first viewpoint signal that is a video signal corresponding to the subject image of the first viewpoint. Furthermore, when a subject image of the second viewpoint is inputted from the optical system 101, the CCD image sensor 102 generates a second viewpoint signal that is a video signal corresponding to the subject image of the second viewpoint.

In the embodiment below, the first viewpoint signal and the second viewpoint signal is referred to as a 3D video signal for three-dimensional viewing, or simply a video signal. The CCD image sensor 102 performs various operations such as exposure, transfer, electronic shutter, and the like.

The video processing unit 103 performs various processing on the video signal generated by the CCD image sensor 102, to generate image data to be displayed on the liquid crystal monitor 110. Furthermore, the video processing unit 103 generates a video signal to be stored again in the memory card 107, to the video signal generated by the CCD image sensor 102. For example, the video processing unit 103 performs, on the video signal generated by the CCD image sensor 102, various video processing such as gamma correction, white balance correction, defect correction, and the like, to generate a video signal to be stored again in the memory card 107.

Furthermore, the video processing unit 103 calculates a disparity amount per processing unit of the image of the first viewpoint signal and the second viewpoint signal which are obtained by the optical system 101 and the CCD image sensor 102, by comparing a processing unit of one image with the corresponding processing unit of the other image. Then, the video processing unit 103 calculates a disparity histogram based on a frequency of occurrence of each disparity amount. Moreover, the video processing unit 103 compares the calculated histogram and a preset histogram pattern, to determine a capturing parameter for obtaining a predetermined three-dimensional effect.

Here, in the present embodiment, a processing unit in the video processing unit 103 is a pixel unit when the 3D video is divided by 4×4 pixel units. It is to be noted that the above processing unit may be a unit of arbitrary number of pixels, such as 8×8 pixel units, 16×16 pixel units, and so on. Furthermore, the disparity amount may be represented by any value as long as the value indicates a shift in the left and right direction between a processing unit of one image and the corresponding processing unit of the other image.

When there is a plurality of disparity amounts in the processing unit, the video processing unit 103 can calculate the disparity amount of the processing unit by selecting any one of an average value, a median value, and one, of the disparity amounts.

Furthermore, the video processing unit 103 uses block matching when detecting a disparity amount. The block matching is processing to search out from a second viewpoint signal a block similar to, for example, 4×4 pixels block in the first viewpoint signal. The video processing unit 103 can be implemented with a digital signal processor (DSP), a microcomputer, or the like.

It is to be noted that the disparity amount is a signed amount. For example, when a video is displayed in a back side of the display screen of the liquid crystal monitor 110 when viewed from the user, that is when the video has a depth, the disparity amount is defined as a minus disparity amount, while when the video is displayed in a front side of the display screen of the liquid crystal monitor 110, that is when the video is projecting toward the user, the disparity amount is signed with plus.

The memory 104 serves as a work memory for the video processing unit 103 and the controller 105. For example, the following is accumulated temporarily in the memory 104: the video signal processed by the video processing unit 103; or the image data inputted from the CCD image sensor 102 that is the data before being processed by the video processing unit 103. A capturing condition of the optical system 101 and the CCD image sensor 102 at capturing is also accumulated temporarily in the memory 104. Here, a capturing condition stands for a subject distance, angle of view information, ISO sensitivity, shutter speed, exposure value, F value, inter-lens distance, time of capture, OIS shift amount, and the like. The memory 104 can be implemented using, for example, a dynamic random access memory (DRAM), a ferroelectric memory, or the like.

Next, description is provided on the controller 105 (three-dimensional video processing apparatus).

The controller 105 is a control means that controls the entire digital camera 100. The controller 105 can be implemented using a semiconductor device or the like. The controller 105 may be implemented using only hardware, or by combining hardware and software. The controller 105 can also be implemented using a microcomputer or the like.

Figure 2:
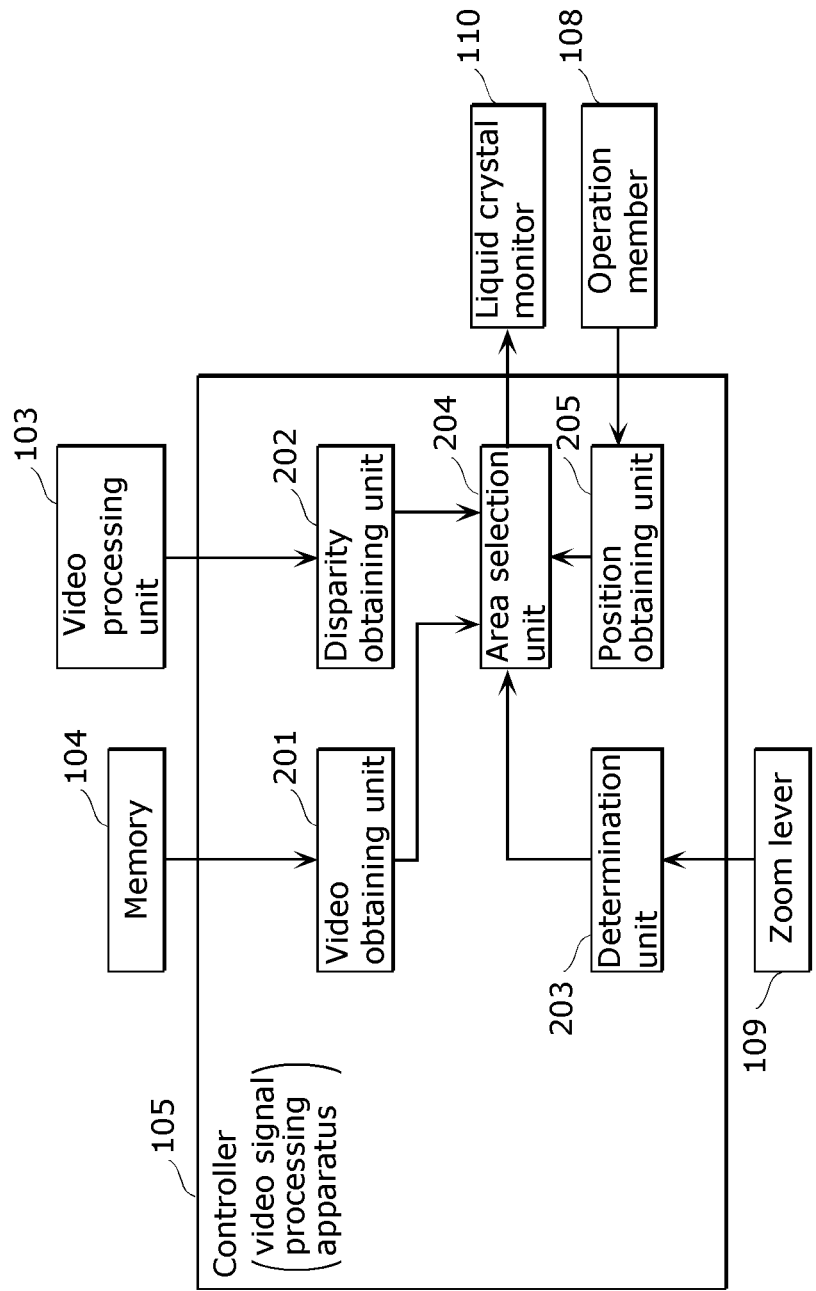
FIG. 2 is a block diagram showing a detailed configuration of a controller according to Embodiment 1.

FIG. 2 is a block diagram showing a detailed configuration of the controller 105 according to Embodiment 1.

The controller 105 includes a video obtaining unit 201, a disparity obtaining unit 202, a determination unit 203, an area selection unit 204, and a position obtaining unit 205.

The image obtaining unit 201 obtains a video signal (3D video) stored in the memory 104.

The disparity obtaining unit 202 obtains a disparity amount per processing unit of the 3D video calculated by the video processing unit 103.

The determination unit 203 determines a size, on the display screen, of an enlargement area that is a part of the 3D video, based on a size of the display screen of the liquid crystal monitor 110 and a zoom magnification (predetermined magnification) inputted by the user from the zoom lever. Specifically, for example, the determination unit 203 determines, as the size of the enlargement area, the size obtained by dividing a length of each side of the display screen of the liquid crystal monitor 110 by a predetermined magnification.

The position obtaining unit 205 obtains a position of a first area (hereinafter also referred to as enlargement instruction position), in the 3D video, that is the area the user desires to enlarge. The position of a first area is inputted by the user through the operation member 108.

The area selection unit 204 selects a part of the 3D video as the enlargement area, and outputs the video on which the enlargement processing is performed to the liquid crystal monitor 110. How to select the enlargement area is described later.

The memory card 107 can be attached and detached to the card slot 106. The card slot 106 is mechanically and electrically connected to the memory card 107.

The memory card 107 internally includes a flash memory or a ferroelectric memory, and is a recording media in which data can be stored.

The operation member 108 is a member that accepts an operation input to the digital camera 100 by the user, and is provided with a directional button and an enter button, for example. The directional button is a member through which the user operates an instruction cursor for designating a position on the image displayed on the liquid crystal monitor 110. The enter button is a member through which the user determines the position indicated by the instruction cursor operated through the directional button.

The zoom lever 109 is a member that accepts an instruction from the user to change the zoom magnification in the optical system 101.

The liquid crystal monitor 110 is a display device capable of displaying, on the display screen, a first viewpoint signal and a second viewpoint signal in a 2D or 3D manner. Here, the above-mentioned first viewpoint signal and the second viewpoint signal are a video signal generated by the CCD image sensor 102 or video signals read from the memory card 107.

Furthermore, the liquid crystal monitor 110 is capable of displaying various setting information of the digital camera 100. For example, the liquid crystal monitor 110 is capable of displaying the exposure value, F value, shutter speed, ISO sensitivity, and the like, which are the capturing condition at capturing.

When 2D displaying the video signal, the liquid crystal monitor 110 selects and displays one of the first viewpoint signal and the second viewpoint signal. Also, the liquid crystal monitor 110 may display the first viewpoint signal and the second viewpoint signal by splitting the screen into right and left or top and bottom. Also, the liquid crystal monitor 110 may display the first viewpoint signal and the second viewpoint signal alternately by each line. Specifically, the liquid crystal monitor 110 has a function to display a 2D video based on the first viewpoint signal and the second viewpoint signal when 2D displaying the video signal.

When 3D displaying the video signal, the liquid crystal monitor 110 may display the first viewpoint signal and the second viewpoint signal using the frame sequential scheme, or by overlaying the first viewpoint signal and the second viewpoint signal.

In the internal memory 111, a control program and the like for controlling the entire digital camera 100 are stored. The internal memory 111 can be implemented using a flash memory, ferroelectric memory, or the like.

[1-2. Operation]

The following describes enlargement operation for a video signal performed by the digital camera 100.

Figure 3:
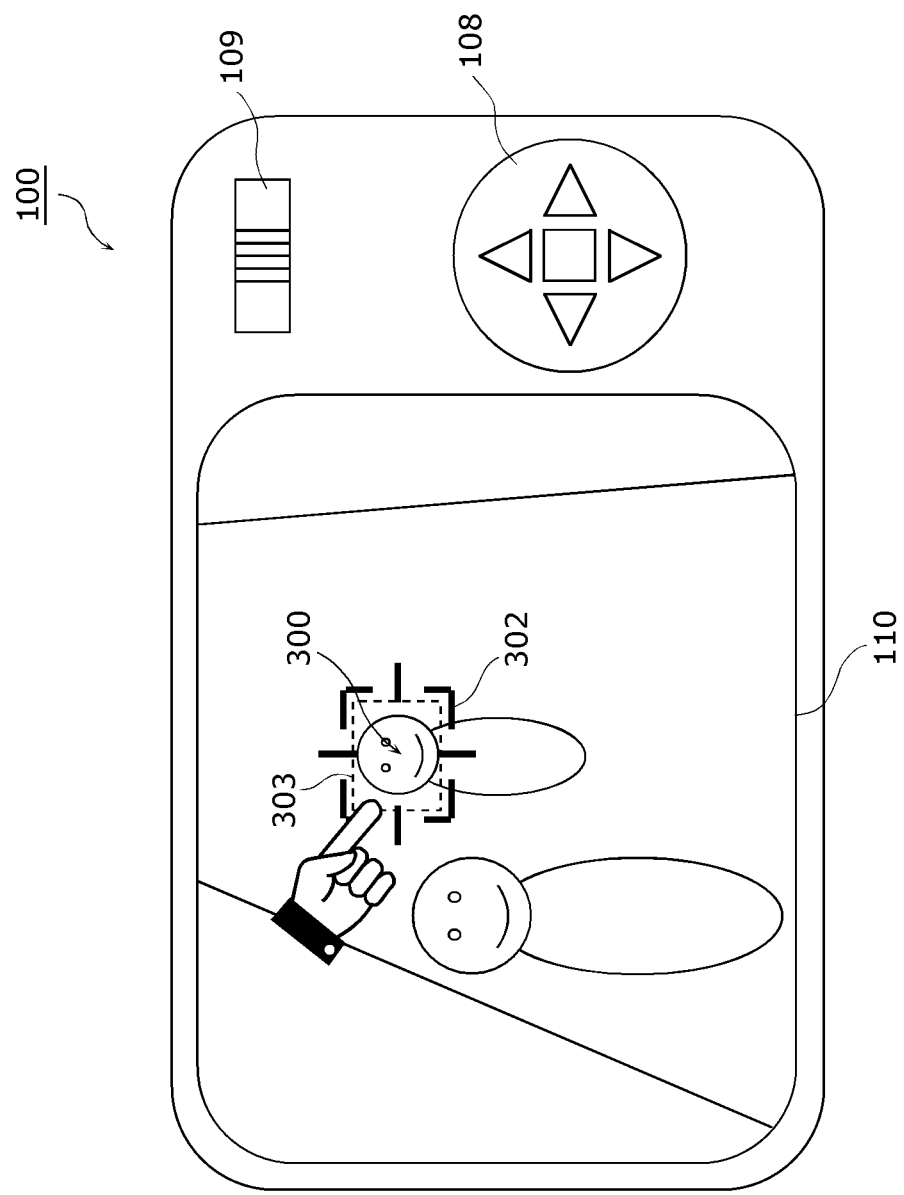
FIG. 3 is a schematic diagram showing how to designate an enlargement area using the digital camera according to Embodiment 1.

FIG. 3 shows a specific configuration of the digital camera 100.

The digital camera 100 includes a zoom lever 109, an operation member 108, and a liquid crystal monitor 110, at the back. Specifically, the user can check a video displayed on the liquid crystal monitor 110 while capturing the video.

[1-2-1. Designation Operation for Enlargement Instruction Position]

First, a designation operation for an enlargement instruction position is described with reference to FIG. 3.

The user designates an enlargement instruction position 300 to be displayed on the liquid crystal monitor 110, using the operation member 108 of the digital camera 100. Specifically, the user operates the operation member 108 to move the instruction cursor 302. The user moves the instruction cursor 302 to a position of the first area 303 that the user desires to enlarge, and then presses the enter button of the operation member 108. The position of the instruction cursor 302 at the time when the button is pressed is the enlargement instruction position 300.

It is to be noted that the enlargement instruction position 300 may be designated through a touch operation, when the liquid crystal monitor 110 of the digital camera 100 has a touch sensor. In this case, the position where the touch operation is performed by the user on the display screen is the enlargement instruction position 300.

[1-2-2. Setting Operation for Enlargement Candidate Area]

Next, description is provided on an enlargement candidate area that includes an area to be a candidate for the enlargement area.

First, an image size of an enlargement area is described.

Figure 4:
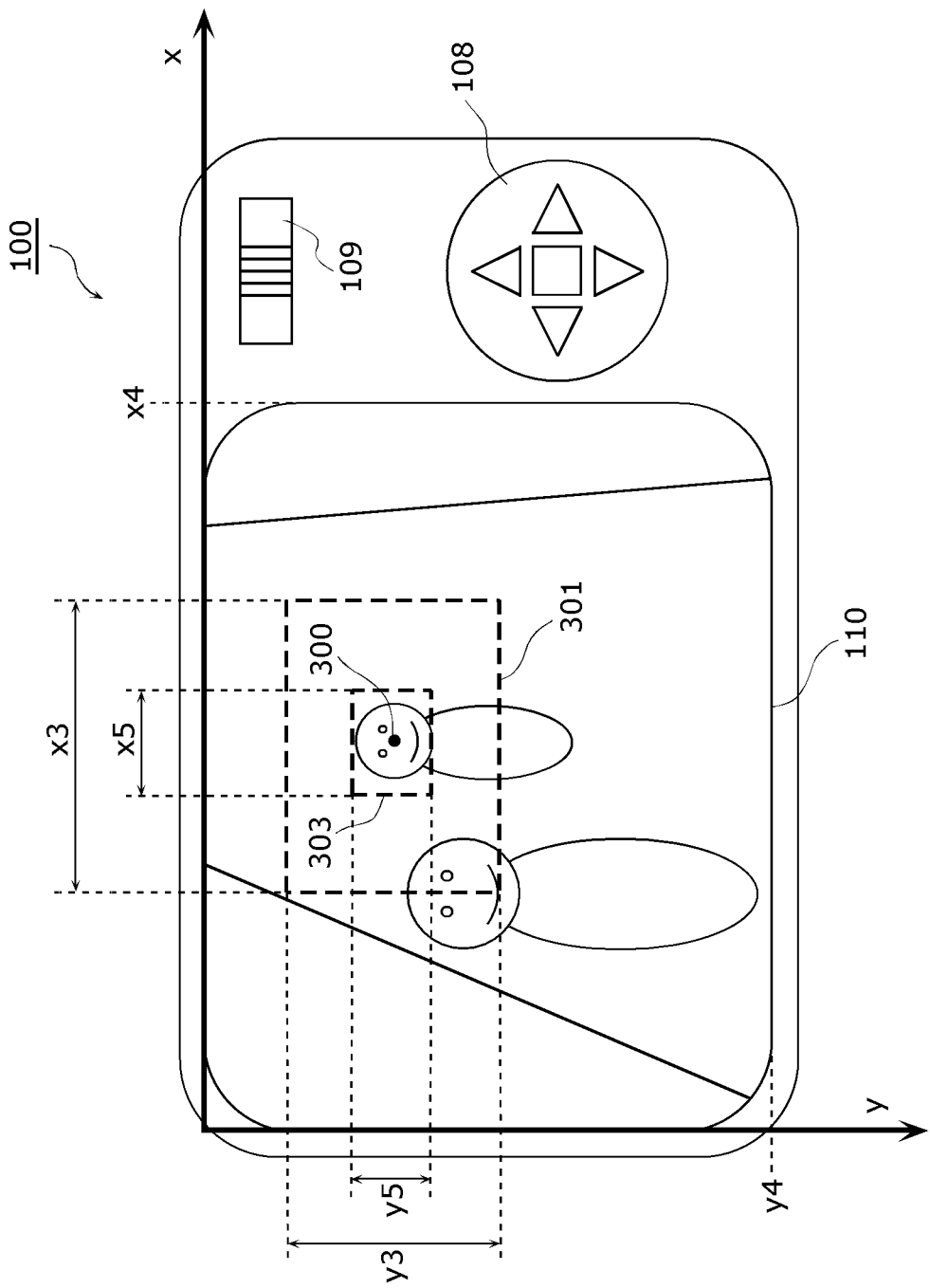
FIG. 4 illustrates an image size of the enlargement area.

FIG. 4 illustrates an image size of the enlargement area.

An image size 301 (x3 pixels×y3 pixels) of the enlargement area is determined by the determination unit 203 based on the size of the display screen and the zoom magnification (predetermined magnification). As shown in FIG. 4, when the size of the display screen is x4 pixels×y4 pixels and the zoom magnification is M, the image size 301 of the enlargement area is x3=x4/M pixels, and y3=y4/M pixels.

The enlargement candidate area is an area in which, when an arbitrary area having a size of the image size 301 is selected in the enlargement candidate area, the first area 303 is certainly included in the selected area. The first area is an area having a size of x5 pixels×y5 pixels as shown in FIG. 4.

Figure 5:
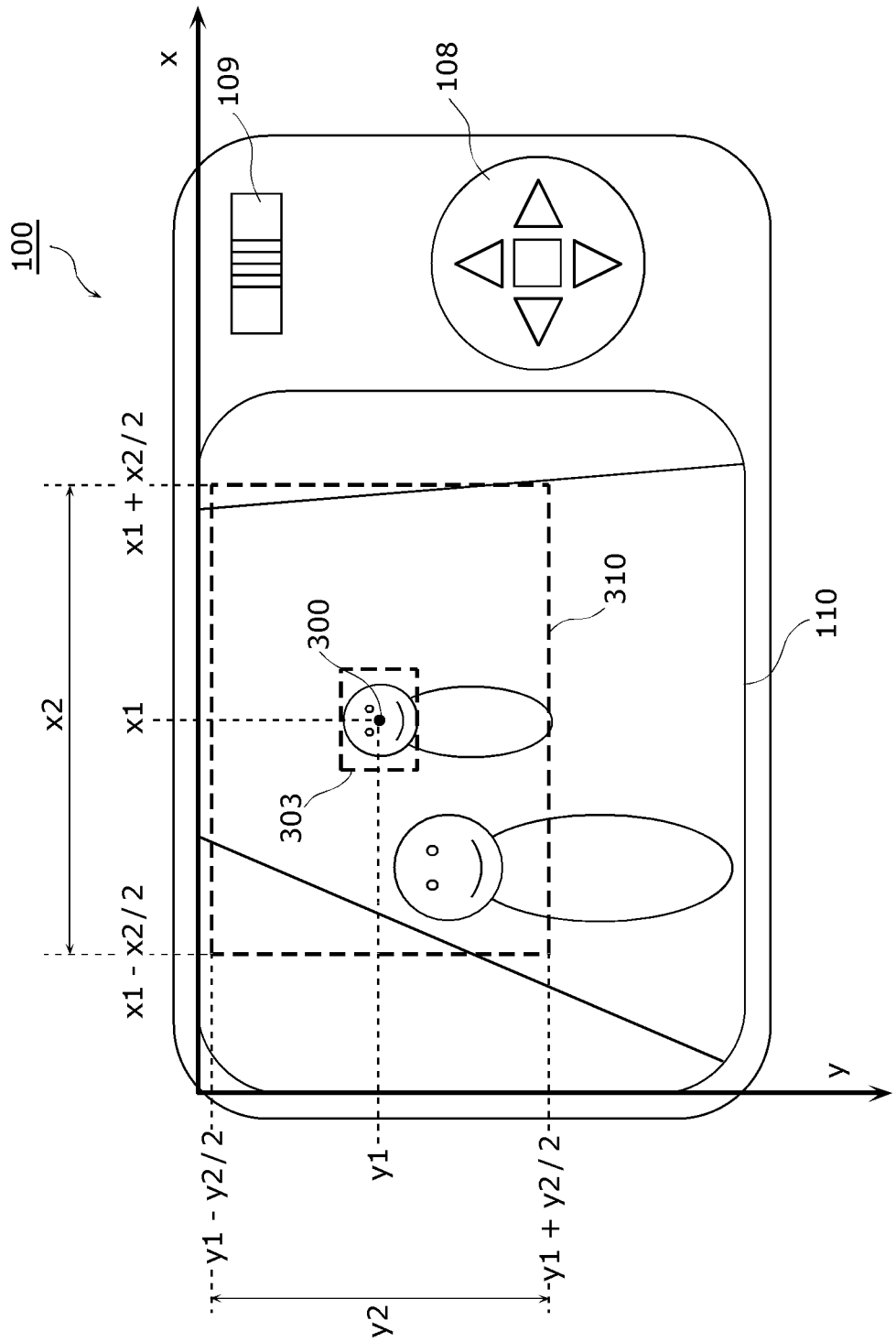
FIG. 5 illustrates an enlargement candidate area.

FIG. 5 illustrates an enlargement candidate area.

When the enlargement instruction position 300 is instructed through the operation member 108, the area selection unit 204 sets the enlargement candidate area 310. The enlargement candidate area 310 is a search area in which the area selection unit 204 searches for a second area that can be the enlargement area. As described above, when the area selection unit 204 selects at least one of the second areas that is an arbitrary area having a size of the image size 301 in the enlargement candidate area, the second area certainly includes the first area 303. In other words, the second area is an area: within the 3D video; including the first area 303; and having the size determined by the determination unit 203 within the 3D video.

Here, the enlargement candidate area 310 is determined based on the above image size 301 and the size of the first area 303. Specifically, as shown in FIG. 5, when the size of the enlargement candidate area 310 is x2 pixels×y2 pixels, x2=2×x3−x5 pixels, and y2=2×y3−y5 pixels.

Assume that, as shown in FIG. 5, coordinates (x1 pixels, y1 pixels) are designated as the enlargement instruction position 300 and the size of the enlargement candidate area 310 is determined to be x2 pixels×y2 pixels. Here, the area selection unit 204 sets, as the enlargement candidate area 310, an area in a square shape and having tops at (x1−x2/2, y1−y2/2), (x1+x2/2, y1−y2/2), (x1+x2/2, y1+y2/2), and (x1−x2/2, y1+y2/2).

[1-2-3. Operation Flow for Enlargement]

The following describes an enlargement operation performed by the controller 105 with reference to the Drawings.

Figure 6:
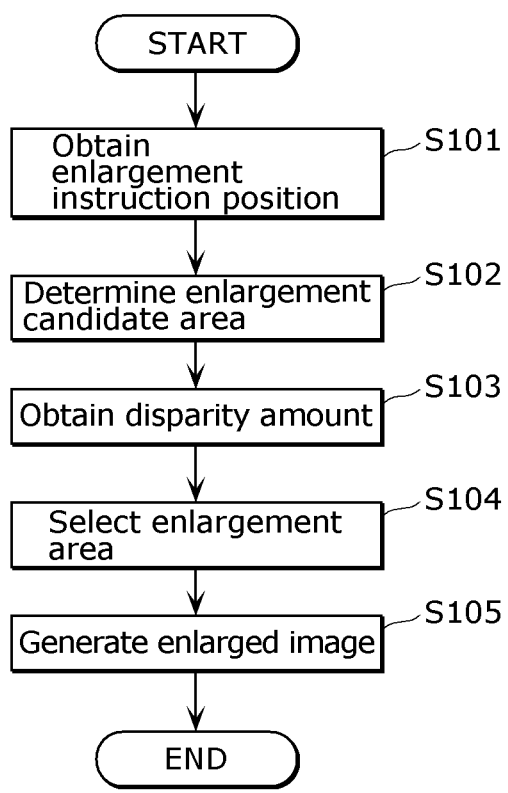
FIG. 6 is a flowchart showing an enlargement operation performed by the controller according to Embodiment 1.

FIG. 6 shows a flowchart of the enlargement operation performed by the controller 105.

First, the position obtaining unit 205 obtains an enlargement instruction position 300 (S101 in FIG. 6). The enlargement instruction position 300 is designated by an operation by the user which has been described.

Then, the area selection unit 204 determines an enlargement candidate area 310 based on the image size 301 and the size of the first area 303 (S102 in FIG. 6).

Next, the disparity obtaining unit 202 obtains a disparity amount of each of all of the processing units within the enlargement candidate area 310 (S103 in FIG. 6).

Next, the area selection unit 204 selects, as the enlargement area, at least one of the second areas in which each of all of the included processing units have a disparity amount within a predetermined range, out of the selectable second areas within the enlargement candidate area 310 (S104 in FIG. 6).

Figure 7:
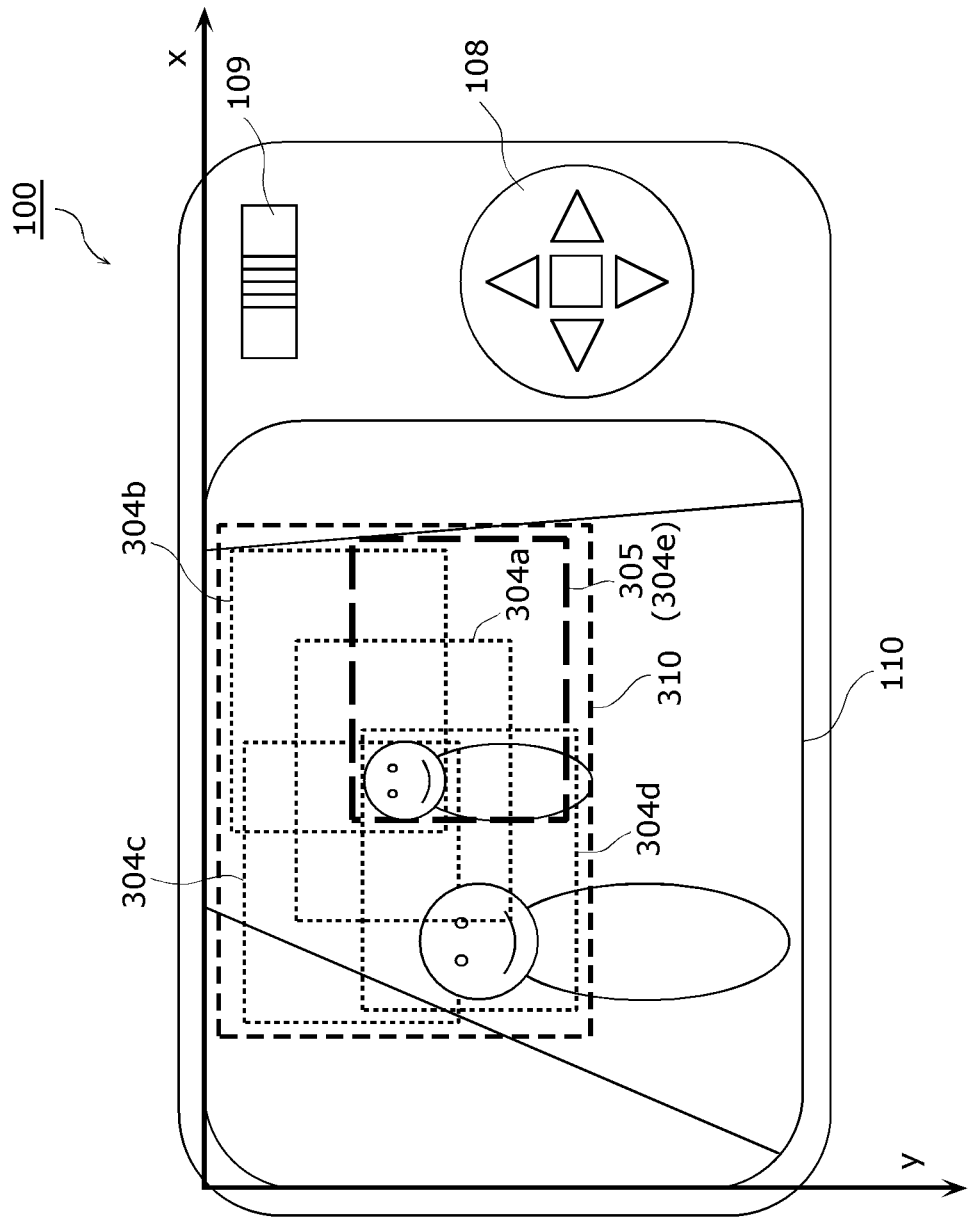
FIG. 7 illustrates how an area selection unit selects the enlargement area.

FIG. 7 illustrates how the area selection unit 204 selects the enlargement area.

The enlargement candidate area includes a plurality of second areas which the area selection unit 204 can select.

For example, in FIG. 7, the area selection unit 204 can select second areas 304a through 304e, and so on.

Here, when the disparity amount of each of all of the processing units included in the at least one of the second areas is within the predetermined range, the selection unit 204 selects the second area as an area that the user can view the area three-dimensionally appropriately after enlargement, that is, as the enlargement area. In the example in FIG. 7, the area selection unit 204 selects the second area 304e as the enlargement area 305.

It is sufficient that the predetermined range is set at a range that allows the user to view the enlarged video three-dimensionally appropriately. For example, the predetermined range may be set at a range in which the disparity amount of the enlarged video is between the upper limit and the lower limit of the disparity amount specified by 3DC Safety Guidelines.

Figure 8:
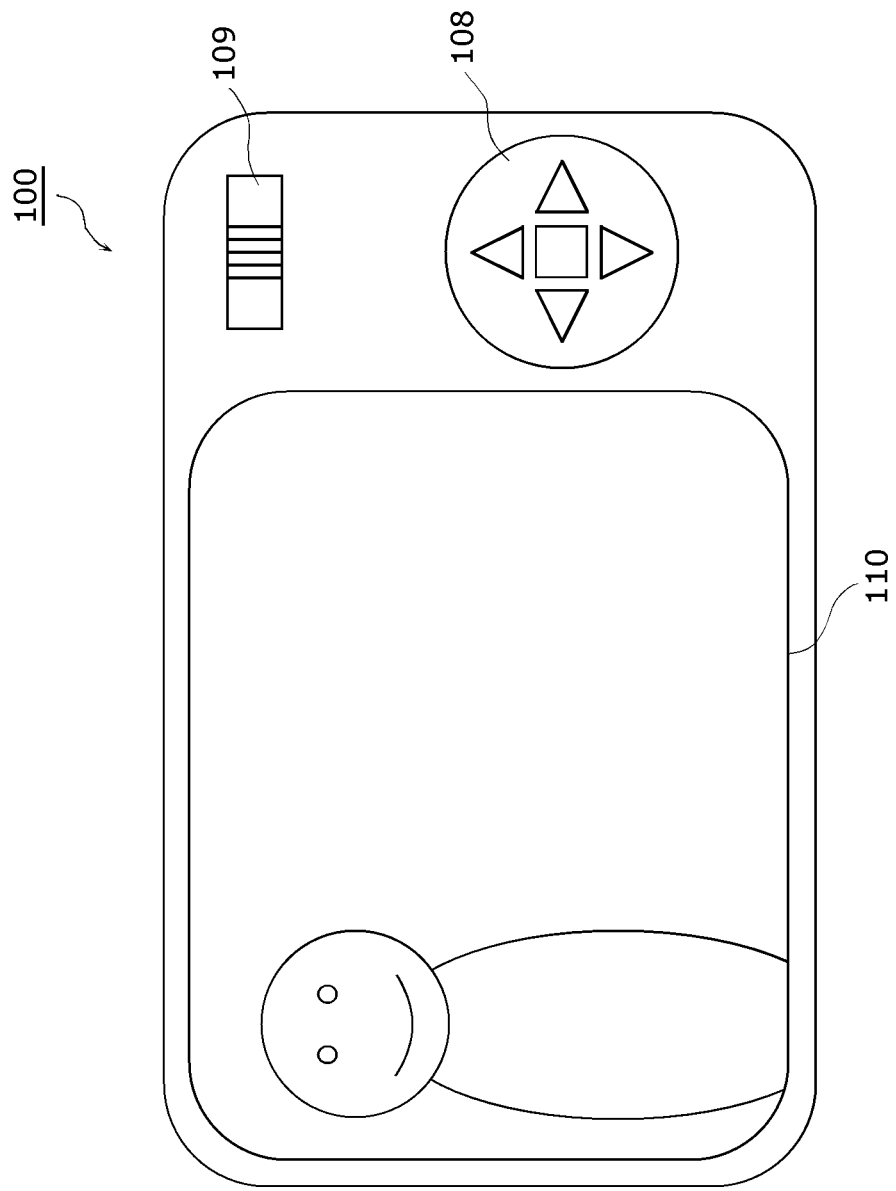
FIG. 8 illustrates a liquid crystal monitor on which an enlarged video is displayed.

Finally, the area selection unit 204 and the video processing unit 103 generate an enlarged video that is a video obtained by enlarging the enlargement area, and display (output) the enlarged video on (to) the liquid crystal monitor 110 (S105 in FIG. 6) as shown in FIG. 8.

[1-3. Advantageous Effect or the Like]

As described above, in Embodiment 1, the three-dimensional video processing apparatus is applied to the controller 105 of the digital camera 100. The controller 105 includes a video obtaining unit 201, a disparity obtaining unit 202, a determination unit 203, an area selection unit 204, and a position obtaining unit 205. Here, out of the 3D video, the area that the user desires to enlarge is the first area. In this case, the area selection unit 204 selects, as the enlargement area, at least one specific second area that has disparity amounts within a predetermined range. The second areas are included in the part of the 3D video, and each includes the first area and has a size determined by the determination unit 203.

Thus, the area selection unit 204 can: enlarge the enlargement area including the area that the user desires to enlarge out of the 3D video while maintaining the predetermined magnification; and further make the enlarged video a video that the user can view three-dimensionally, appropriately and safely.

It is to be noted that in the present embodiment, the area selection unit 204 may select, as the enlargement area 305, at least one of the second areas that includes processing units having a smallest disparity amount distribution.

Thus, the user can view a safer enlarged video.

Furthermore, in the present embodiment, the area selection unit 204 may select, as the enlargement area 305, at least one of the second areas that has a least difference between an average value of disparity amounts of the processing units included in the first area and an average value of disparity amounts of the processing units included in the second area.

Thus, the area selection unit 204 selects, as the enlargement area, at least one of the second areas that has disparity amounts close to the disparity amounts included in the first area 303. The first area 303 is the area the user desires to enlarge. This makes the disparity amounts of the first area 303 and the disparity amounts of the peripheral area close. Therefore, the user can view the enlarged video three-dimensionally, naturally and effectively.

Furthermore, in the present embodiment, the area selection unit 204 may select, as the enlargement area 305, at least one of the second areas that is positioned closest to a position of the first area 303 on the display screen. Here, the distance from the position of the first area 303 to the position of the second area is obtained using, for example, Euclidean distance from the enlargement instruction position 300 to the processing unit corresponding to the center position of the second area. The distance from the position of the first area 303 to the position of second area may be obtained using chessboard distance or city block distance.

With this, the first area 303 desired to be enlarged is displayed around the center of the enlarged video, which makes it even easier for the user to view the first area 303.

It is to be noted that, in S103 above, the disparity amount obtained by the disparity obtaining unit 202 may be obtained from a disparity map, based on the video obtained from the CCD image sensor 102. The disparity map is generated in real time by the video processing unit 103.

Furthermore, in S103 above, the disparity amount obtained by the disparity obtaining unit 202 may be obtained from meta information of the three-dimensional video saved in the memory card 107.

In S103 above, the disparity amount obtained by the disparity obtaining unit 202 may not be the disparity amount per processing unit. It is sufficient if a judgment can be made on whether or not the maximum disparity (a disparity of a portion where the user perceives the video at the backmost and a disparity of a portion where the user perceives the video at the frontmost) of the second area is within a predetermined range.

It is to be noted that the aspect ratio of the enlargement area 305 is the same as the aspect ratio of the video before enlargement.

Thus, it is possible to enlarge the video in such a manner that does not give a strange feeling to the user after enlargement.

Embodiment 2

The following describes Embodiment 2 with reference to FIGS. 9 to 12. In Embodiment 2, description is provided on an example in which the area selection unit uses an evaluation value to select an enlargement area.

[2-1. Configuration]

The entire configuration of a digital camera according to Embodiment 2 is the same as the configuration described with reference to FIGS. 1 and 3.

Figure 9:
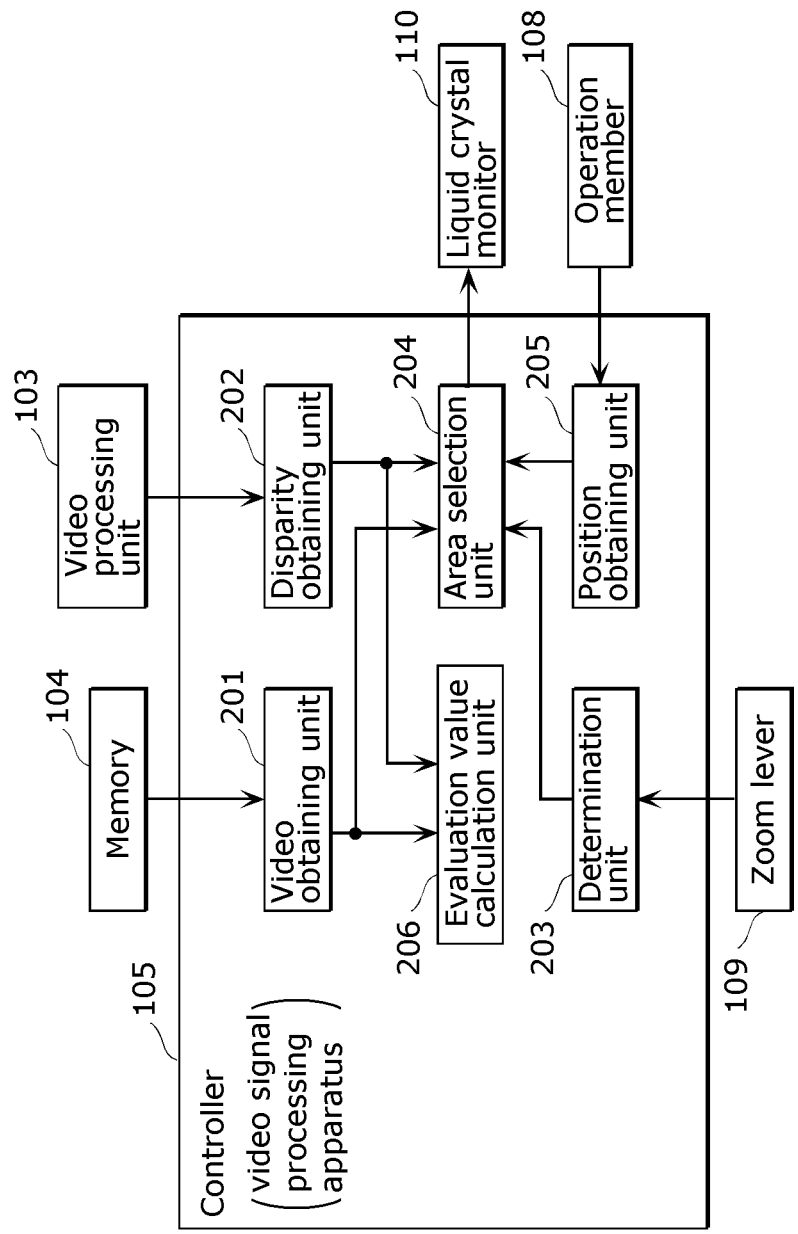
FIG. 9 is a block diagram showing a detailed configuration of a controller according to Embodiment 2.

FIG. 9 is a block diagram showing a detailed configuration of the controller 105 according to Embodiment 2.

The controller 105 includes an evaluation value calculation unit 206, in addition to the constituent elements described in Embodiment 1.

The evaluation value calculation unit 206 calculates an evaluation value C per processing unit. The evaluation value C of a processing unit is represented by a sum of: a first evaluation value representing an absolute value of a relative disparity amount of the processing unit obtained with reference to the disparity amount of a processing unit corresponding to the enlargement instruction position 300; and a second evaluation value representing a distance from the enlargement instruction position 300 to the processing unit. Specifically, as described later, the evaluation value C decreases as the processing unit has a less difference from the disparity amount of the processing unit corresponding to the enlargement instruction position 300. Furthermore, the evaluation value C decreases as the distance from the processing unit to the enlargement instruction position 300 is shorter.

[2-2. Operation]

The following describes an enlargement operation performed by the controller 105 according to Embodiment 2.

Figure 10:
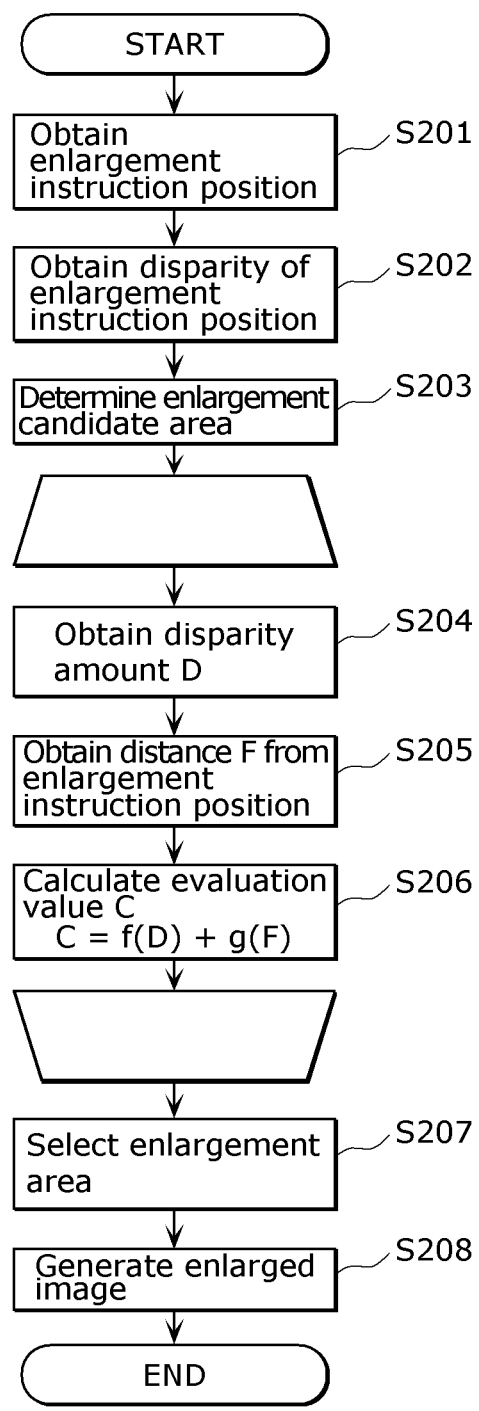
FIG. 10 is a flowchart showing an enlargement operation performed by the controller according to Embodiment 2.

FIG. 10 shows a flowchart of the enlargement operation performed by the controller 105 according to Embodiment 2.

First, the position obtaining unit 205 obtains an enlargement instruction position 300 (S201 in FIG. 10).

Next, the position obtaining unit 202 obtains a disparity amount at the enlargement instruction position 300 (S202 in FIG. 10). Specifically, the position obtaining unit 202 obtains a disparity amount of a processing unit corresponding to the enlargement instruction position 300 (hereinafter also referred to as a first processing unit).

Then, the area selection unit 204 determines an enlargement candidate area 310 based on the image size 301 and the size of the first area 303 (S203 in FIG. 10).

Here, a vertical length ZH (length in x axis direction in FIG. 4) and a horizontal length ZW (length in y axis direction in FIG. 4) of the enlargement candidate area 310 are represented by Equation 1 below using, for example, a vertical length H and a horizontal length W of the liquid crystal monitor 110 and a predetermined magnification M.

[Math 1]

$$\begin{cases} ZH = 2 \cdot H / M \\ ZW = 2 \cdot W / M \end{cases} \quad \text{Equation 1}$$

According to Equation 1, the center position of the enlargement candidate area 310 is the enlargement instruction position 300.

Next, the evaluation value calculation unit 206 performs operation of S204 through S206 on all of the processing units within the enlargement candidate area 310, to calculate the evaluation value for each processing unit.

The evaluation value C calculated by the evaluation value calculation unit 206 is given by Expression 2 below, for example. Here, $\alpha$ and $\beta$ are arbitrary constants.

[Math 2]

$$C = \alpha \cdot |D| + \beta \cdot F \quad \text{Equation 2}$$

Here, D is a relative disparity amount obtained with reference to the disparity amount of the first processing unit, and can be obtained by the following: [disparity amount of the processing unit]−[disparity amount of the enlargement instruction position]. Specifically, $\alpha \cdot |D|$ (first evaluation value) is a value that decreases as the disparity amount D of the processing unit is smaller.

Furthermore, F is a distance from the enlargement instruction position 300 to the processing unit. Specifically, $\beta \cdot F$ (second evaluation value) is a value that decreases as the distance F to the processing unit is shorter. The distance F is Euclidean distance on the image, however, the distance F may be, for example, chessboard distance on the image, or city block distance on the image.

Specifically, the evaluation value calculation unit 206 first obtains a disparity amount D of each processing unit through the disparity obtaining unit 202 (S204 in FIG. 10), and obtains a distance F to each processing unit based on the video signal which the video obtaining unit 201 has obtained (S205 in FIG. 10). The evaluation value calculation unit 206 calculates an evaluation value C of each processing unit from the disparity amount D and the distance F obtained, based on Equation 2 (S206 in FIG. 10).

Next, the area selection unit 204 selects, as the enlargement area 305, at least one of the second areas having the smallest sum of the evaluation value C out of all of the processing units included in the second area, out of the selectable second areas in the enlargement candidate area 310 (S207 in FIG. 10). The enlargement area 305 selected by the area selection unit 204 can be given by Expression 3 below, for example.

[Math 3]

$$\underset{x,y}{\mathrm{argmin}} \sum_{i=x-ZW/4}^{x+ZW/4} \sum_{j=y-ZH/4}^{y+ZH/4} C_{i,j} \quad \text{Equation 3}$$

Here, the area selection unit 204 selects, as the enlargement area 305, at least one of the second areas that includes processing units having a smallest sum of the evaluation values C. Specifically, a second area is less likely to be selected as the enlargement area 305, as the second area includes more processing units each having a great disparity amount D. Also, a second area is less likely to be selected as the enlargement area 305 as the second area is positioned farther from the enlargement instruction position 300.

Finally, the area selection unit 204 and the video processing unit 103 generate an enlarged video that is a video obtained by enlarging the enlargement area 305 based on the enlargement area 305, and displays (outputs) the enlarged video on (to) the liquid crystal monitor 110 (S208 in FIG. 10).

It is possible to hide a processing unit having a disparity amount D greater than a predetermined value (for example, to make the processing unit a black image).

Furthermore, in S206, the evaluation value C calculated by the evaluation value calculation unit 206 is given by Expression 4 below, for example. Here, α and β, and T are arbitrary constants.

[Math 4]

$$C = \alpha \cdot f(D) + \beta \cdot F \quad \text{Equation 4}$$

$$f(D) = \begin{cases} |D| & ; |D| \le T \\ \infty & ; |D| > T \end{cases}$$

Specifically, when the absolute value of the difference between the disparity amount of the enlargement instruction position 300 and the disparity amount of the processing unit is greater than or equal to the predetermined threshold, the evaluation value C becomes a large value irrespective of the distance F. This makes a second area less likely to be selected as the second area is positioned farther from the enlargement instruction position 300. Furthermore, this makes the area selection unit 204 able to certainly keep the disparity distribution within a desired range after enlargement.

In this case, in S207, the enlargement area 305 selected by the area selection unit 204 can be given by Expression 5 below, for example. Here, S is an arbitrary constant.

[Math 5]

$$\underset{x,y}{\mathrm{argmin}} \sum_{i=x-ZW/4}^{x+ZW/4} \sum_{j=y-ZH/4}^{y+ZH/4} f(C_{i,j}) \quad \text{Equation 5}$$

$$f(C_{i,j}) = \begin{cases} 1 & ; C_{i,j} \ge S \\ 0 & ; C_{ij} < S \end{cases}$$

Specifically, when the evaluation value C of the processing unit is greater than or equal to the predetermined threshold S, the evaluation value calculation unit 206 assigns a label "1" to the processing unit. The label "1" indicates that the processing unit is to be hidden. It is to be noted that when the evaluation value C of the processing unit is less than the predetermined threshold S, a label "0", that is preset, is assigned to the processing unit. The above predetermined threshold is a threshold which is set preliminarily, but may also be user-changeable.

In the above manner, a digital camera 100 can be provided in which whether the processing unit having a great disparity amount D is to be shown or hidden can be set according to the three-dimensional viewing capability of the user.

Furthermore, as described above, the evaluation value calculation unit 206 does not have to calculate an evaluation value C for each of the all of the processing units included in the enlargement candidate area 310.

The following describes another operation flow of video signal enlargement operation performed by the controller 105 according to Embodiment 2, with focusing on an evaluation value calculation operation and with reference to the Drawings.

Figure 11:
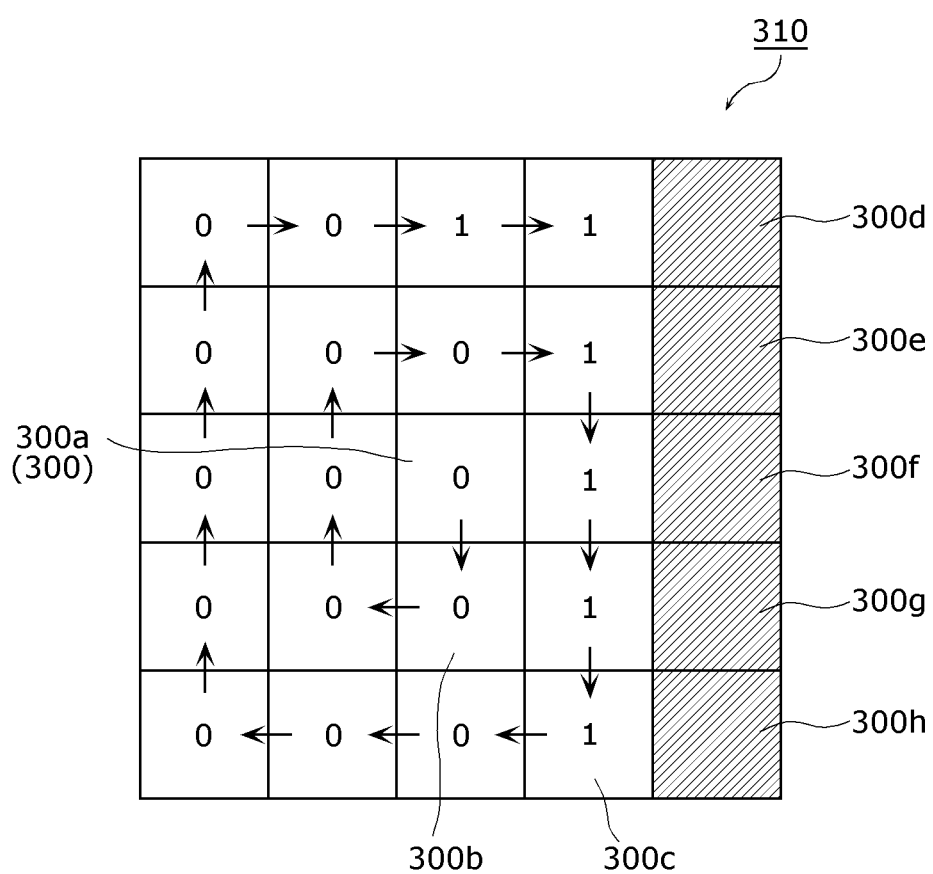
FIG. 11 is a schematic diagram of the enlargement candidate area, for illustrating a calculation order of an evaluation value.

FIG. 11 is a schematic diagram of the enlargement candidate area 310 which illustrates calculation order for the evaluation value C.

FIG. 12 shows a flowchart showing another example of the enlargement operation performed by the controller 105 according to Embodiment 2.

It is to be noted that the enlargement operation described with reference to FIG. 11 and FIG. 12 is an example of the operation in which the evaluation value calculation unit 206 uses Expression 4 and Expression 5 above to calculate the evaluation value.

The evaluation value calculation unit 206 calculates the evaluation value C of each processing unit starting from a first processing unit 300a, as the center, and expanding the search range to the periphery, one adjacent processing unit at a time. The first processing unit 300a is the processing unit corresponding to the designated enlargement instruction position 300.

Specifically, as shown in FIG. 11, the evaluation value C is calculated for eight processing units each having a chessboard distance 1 on the image from the first processing unit 300a, in the order of clockwise rotation direction starting from the processing unit 300b positioned immediately below the first processing unit 300a.

Then, the evaluation value C is calculated for 16 processing units each having a chessboard distance 2 on the image from the first processing unit 300a, in the order of clockwise rotation direction starting from the processing unit 300c. It is to be noted that the number "0" or "1" assigned to each processing unit in FIG. 11 is a label indicating whether the above processing unit is the processing unit to be shown or the processing unit to be hidden.

In the above-described order, evaluation value calculation shown in S209, S204 through S206, S210, and S211 in FIG. 12 is performed on each processing unit.

As shown in FIG. 12, the evaluation value calculation unit 206 determines, for each processing unit, whether or not the processing unit is linked from the enlargement instruction position 300 (first processing unit 300a) (S209 in FIG. 12). Here, "linked" means that the processing unit is linked to the first processing unit 300a via one or more processing units having the evaluation value C less than the predetermined threshold S (the processing units assigned 0 in FIG. 11).

In other words, when it is possible to arrive, from a processing unit, at the first processing unit 300a by tracking the adjacent processing units each having the evaluation value C less than the predetermined threshold S (when there is a path of processing units to the first processing unit), the processing unit can be said to be linked to the first processing unit. In the present embodiment, although the "adjacent processing unit" stands only for the processing unit adjacent to a processing unit in the top, bottom, right, and left directions, the "adjacent processing unit" may also include a processing unit adjacent in the diagonal direction.

On the processing unit linked to the first processing unit 300a (Yes in S209 in FIG. 12), calculation of evaluation value C is performed (S204 through S206 in FIG. 12), and determination is made on whether or not the evaluation value C of the processing unit is greater than or equal to the threshold S (S210 in FIG. 12). When the evaluation value C of the processing unit is greater than or equal to the threshold S (Yes in S210 in FIG. 12), a label "1" is assigned to the processing unit. The label "1" indicates that the processing unit is to be hidden. For example, in FIG. 11, the processing unit 300c is the processing unit assigned the label "1".

When the evaluation value C of the processing unit is greater than or equal to the threshold S (Yes in S210 in FIG. 12), a label "1" is assigned to the processing unit. The label "1" indicates that the processing unit is to be hidden (S211 in FIG. 12). For example, in FIG. 11, the processing unit 300c is the processing unit assigned the label "1".

When the evaluation value C of the processing unit is less than the predetermined threshold S (No in S210 in FIG. 12), a label "0", that is preset, is assigned to the processing unit. For example, in FIG. 11, the label of the processing unit 300b is "0".

Meanwhile, on the processing unit not linked to the first processing unit 300a (No in S209 in FIG. 12), calculation of evaluation value C (S204 through S206, S210, and S211 in FIG. 12) is not performed. For example, in FIG. 11, the evaluation value C is not calculated for the processing units 300d through 300h.

Next, the area selection unit 204 selects, as the enlargement area 305, at least one of the second areas having the smallest sum of the evaluation value C out of all of the processing units included in the second area, out of the selectable second areas in the area in which the evaluation value is calculated within the enlargement candidate area 310 (S207 in FIG. 10).

Finally, the area selection unit 204 and the video processing unit 103 generate an enlarged video that is a video obtained by enlarging the enlargement area 305, and display on (output to) the liquid crystal monitor 110 the enlarged video (S208 in FIG. 12).

[2-3. Advantageous Effect or the Like]

As described above, in Embodiment 2, the controller 105 (three-dimensional video processing apparatus) further includes the evaluation value calculation unit 206, and the area selection unit 204 selects the enlargement area based on the evaluation value C calculated by the evaluation value calculation unit 206.

The evaluation value C is a sum of a first evaluation value $\alpha \cdot |D|$ and a second evaluation value $\beta \cdot |D|$, the first evaluation value decreasing as an absolute value of the disparity amount of the processing unit is less, and the second evaluation value decreasing as a position of the processing unit on the display screen is closer to the position of the first area.

Thus, the area selection unit 204 can select the enlargement area 305 with taking both of the disparity amount D and the distance F into consideration.

It is to be noted that the evaluation value C is not limited to those described in Embodiment 2. For example, in Expression 2 and Expression 4, $\beta$ may be 0. Even when $\beta$ is 0, the area selection unit 204 can enlarge the enlargement area by a predetermined magnification, as a video which the user can view three-dimensionally, appropriately and safely.

Furthermore, in Embodiment 2, the relative disparity amount obtained with reference to the disparity amount of the first processing unit was used as the disparity amount D, however, the disparity amount D may be an absolute disparity amount.

Furthermore, the evaluation value calculation unit 206 in Embodiment 2 calculates the evaluation value of each of the processing units which are linked to the first processing unit 300a via the processing unit having the evaluation value C less than the predetermined threshold S.

Thus, the evaluation value C calculation processing can be omitted for the areas that cannot be a candidate for the enlargement area, which can reduce costs for evaluation value calculation and the load placed by the evaluation value calculation.

Other Embodiments

The foregoing describes Embodiments 1 and 2, as an example of the technique disclosed in the present application. However, the technique in the present disclosure is not limited to the above, and may be applied to embodiments obtained by modifying, replacing, adding, and omitting the above embodiments as appropriate. It is also possible to combine each of the constituent elements described in Embodiment 1 and Embodiment 2 above to make a new embodiment.

Therefore, the following describes other embodiments collectively.

Figure 13A:
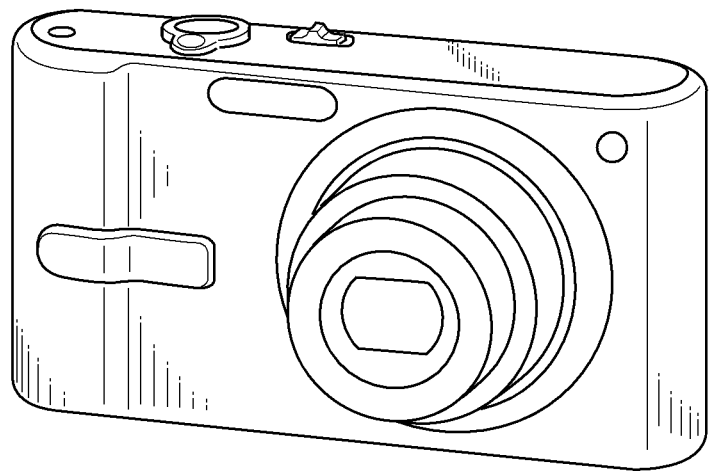
FIG. 13A shows an example of application of the three-dimensional video processing apparatus.
Figure 13B:
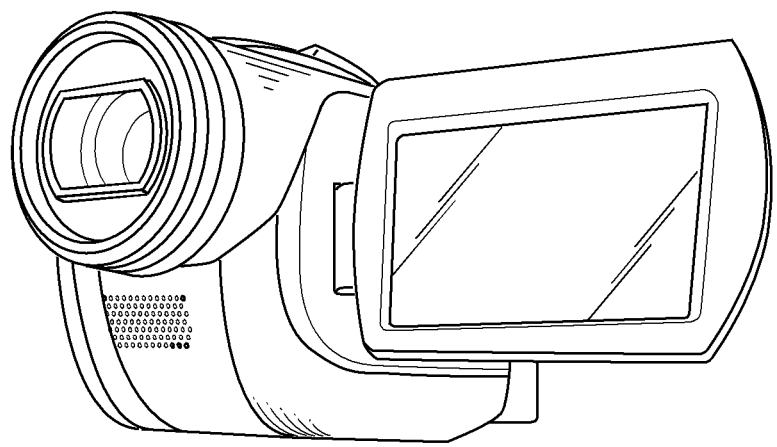
FIG. 13B shows another example of application of the three-dimensional video processing apparatus.

In Embodiment 1 and Embodiment 2, an example is described in which the three-dimensional video processing apparatus according to the present disclosure is applied to a digital camera as shown in FIG. 13A. However, the three-dimensional video processing apparatus is applicable also to a digital video camera as shown in FIG. 13B.

Figure 14:
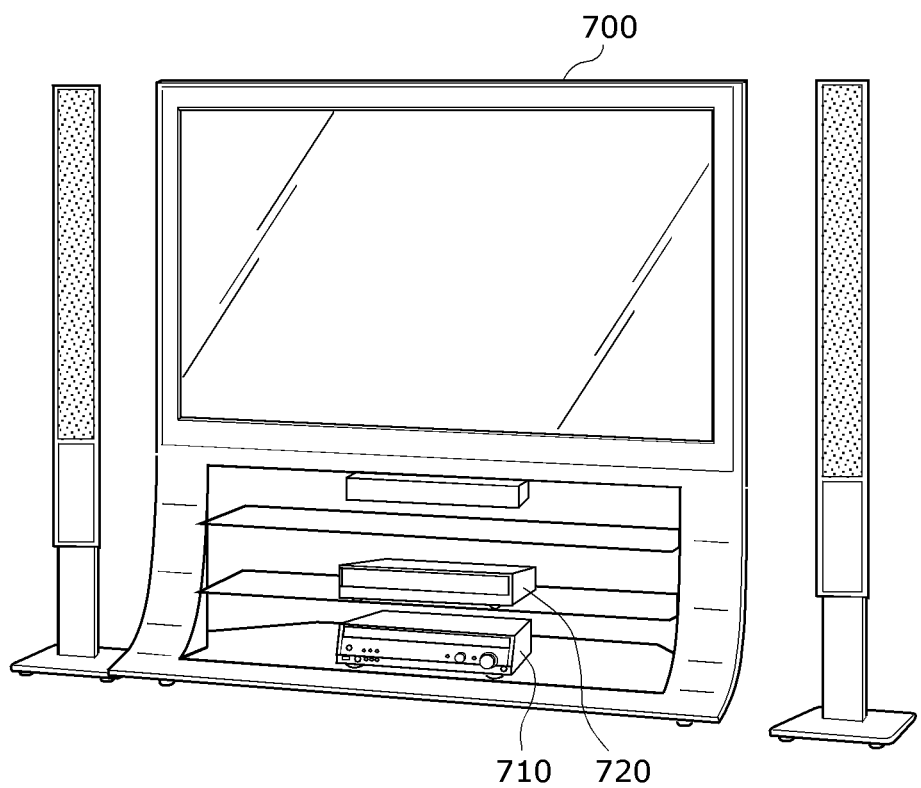
FIG. 14 shows yet another example of application of the three-dimensional video processing apparatus.

Furthermore, for example, the three-dimensional video processing apparatus according to the present disclosure is applicable to a TV 700 shown FIG. 14. In this case, the three-dimensional video processing apparatus performs video enlargement processing on the video obtained from TV broadcasting, a Blu-ray player 710, or a set-top box 720 shown in FIG. 14.

The three-dimensional video processing apparatus according to the present disclosure is also applicable to the Blu-ray player 710. In this case, the three-dimensional video processing apparatus can perform video enlargement processing for a video obtained from any kind of inserted recording medium, such as a Blu-ray disc, digital versatile disc (DVD), hard disc drive (HDD), or the like.

The three-dimensional video processing apparatus according to the present disclosure is also applicable to a set-top box 720. In this case, on the video obtained from the cable TV broadcasting or the like, the three-dimensional video processing apparatus can perform the video enlargement processing.

Furthermore, the following cases are also included in the present disclosure.

(1) Specifically, each of the aforementioned apparatuses can be implemented with a computer system including a microprocessor, a ROM, a RAM, a hard disk unit, a display unit, a keyboard, a mouse, and the like. A computer program is stored in the RAM or hard disk unit. The respective apparatuses achieve their functions through the microprocessor's operation according to the computer program. Here, the computer program is configured by combining a plurality of instruction codes indicating instructions for the computer, in order to achieve predetermined functions.

(2) A part or all of the constituent elements included in each of the apparatuses above may include a single System Large Scale Integration (LSI). The System LSI is a super multifunctional LSI manufactured by integrating plural constituent elements on a single chip, and is specifically a computer system including a microprocessor, a ROM, a RAM, and so on. The ROM has a computer program stored. As the microprocessor loads a computer program from the ROM to the RAM and operates arithmetic operation or the like according to the loaded computer program, the system LSI performs its functions.

(3) Some or all of the constituent elements included in each of the respective apparatuses may be configured as an IC card which can be attached and detached from the respective apparatuses or as a stand-alone module. The IC card or the module may be a computer system including the microprocessor, ROM, RAM, and the like. The IC card or the module may also include the aforementioned super-multi-function LSI. The IC card or the module achieves its function through the microprocessor's operation according to the computer program. The IC card or the module may have tamper resistant.

(4) The present disclosure may be implemented with the method described above. The present disclosure may also be implemented with a computer program which implements such a method with a computer or a digital signal formed of a computer program.

The present invention may also be implemented with a computer-readable recording medium, for example, a flexible disk, a hard disk, a CD-ROM, an MO, a DVD, a DVD-ROM, a DVD-RAM, a Blu-ray Disc (BD), a semiconductor memory, or the like, on which such a computer program or digital signal is recorded. The present invention may also be implemented with the digital signal recorded on these recording media.

Furthermore, the present invention may also be realized by the transmission of the aforementioned computer program or digital signal via a telecommunication line, a wireless or wired communication line, a network represented by the Internet, a data broadcast and so forth.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

Each of the above embodiment and modification examples may be combined.

The foregoing describes Embodiments 1 and 2, as an example of the technique disclosed in the present application. The attached Drawings and Specification are provided for supporting the embodiments.

Accordingly, the constituent elements seen in the Drawings and Specification may include not only constituent elements necessary for solving the problem but also some constituent elements which are not necessary for solving the problem in order to exemplify the above technique. Therefore, even when some unnecessary constituent elements are seen in the attached Drawings or Specification, it should not be acknowledged immediately that the unnecessary constituent elements are necessary.

Furthermore, the above embodiments are raised to exemplify the technique according to the present disclosure. Therefore, various modification, replacement, addition, and omission may be made within or equivalent to the scope of the Claims.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The three-dimensional video processing apparatus and the three-dimensional video processing method according to one or more exemplary embodiments disclosed herein are capable of enlarging a three-dimensional video by a predetermined magnification which allows a user to view the video safely, and are useful as a digital camera, a display, and the like for displaying a three-dimensional video.

The invention claimed is:

1. A three-dimensional video processing apparatus that performs processing for enlarging a part of 3D video for three-dimensional viewing displayed on a display screen by a predetermined magnification on the display screen, the apparatus comprising:
a video obtaining unit configured to obtain the 3D video;
a position obtaining unit configured to obtain a position of a first area which is an area included in the part of the 3D video;
a disparity obtaining unit configured to obtain disparity amounts of the 3D video per processing unit obtained by dividing the 3D video by a predetermined number of pixels;
a determination unit configured to determine a size, on the display screen, of an enlargement area based on a size of the display screen and the predetermined magnification, the enlargement area being included in the part of the 3D video;
an area selection unit configured to select, as the enlargement area, at least one of a plurality of second areas that includes processing units each having a disparity amount within a predetermined range, the second areas being included in the part of the 3D video, and each including the first area and having a size determined by the determination unit; and
an evaluation value calculation unit configured to calculate an evaluation value of each of the processing units,
wherein the evaluation value is a sum of a first evaluation value and a second evaluation value, the first evaluation value decreasing as an absolute value of the disparity amount of the processing unit is less, and the second evaluation value decreasing as a position of the processing unit on the display screen is closer to the position of the first area, and the area selection unit is configured to select, as the enlargement area, at least one of the second areas that includes processing units having a smallest sum of the evaluation values.

2. The three-dimensional video processing apparatus according to claim 1, wherein the area selection unit is configured to select, as the enlargement area, at least one of the second areas that includes processing units having a smallest disparity amount distribution.

3. The three-dimensional video processing apparatus according to claim 1, wherein the area selection unit is configured to select, as the enlargement area, at least one of the second areas that has a least difference between an average value of disparity amounts of the processing units included in the first area and an average value of disparity amounts of the processing units included in the second area.

4. The three-dimensional video processing apparatus according to claim 1, wherein the area selection unit is configured to select, as the enlargement area, at least one of the second areas that is positioned closest to a position of the first area on the display screen.

5. The three-dimensional video processing apparatus according to claim 1, wherein the disparity obtaining unit is configured to obtain a relative disparity amount for each of the processing units, the relative disparity amount being a difference from a disparity amount of a first processing unit which is one of the processing units and is corresponding to the position of the first area, and the evaluation value is a sum of the second evaluation value and the first evaluation value that decreases as an absolute value of the disparity amount of the processing unit is less.

6. The three-dimensional video processing apparatus according to claim 1, wherein the evaluation value calculation unit is configured to calculate the evaluation value of each of the processing units that is linked to the first processing unit via a processing unit having an evaluation value smaller than a predetermined threshold.

7. The three-dimensional video processing apparatus according to claim 1, wherein the area selection unit is configured to select, as the enlargement area, a second area having a same aspect ratio as the 3D video, the second area being included in the plurality of second areas.

8. A three-dimensional video processing method for performing processing for enlarging a part of 3D video for three-dimensional viewing displayed on a display screen by a predetermined magnification on the display screen, the method comprising:

obtaining the 3D video;

obtaining a position of a first area which is an area included in the part of the 3D video;

obtaining disparity amounts of the 3D video per processing unit obtained by dividing the 3D video by a predetermined number of pixels;

determining a size, on the display screen, of an enlargement area based on a size of the display screen and the predetermined magnification, the enlargement area being included in the part of the 3D video;

selecting, as the enlargement area, at least one of a plurality of second areas that includes processing units each having a disparity amount within a predetermined range, the second areas being included in the part of the 3D video, and each including the first area and having a size determined by the determination unit; and calculating an evaluation value of each of the processing units, wherein the evaluation value is a sum of a first evaluation value and a second evaluation value, the first evaluation value decreasing as an absolute value of the disparity amount of the processing unit is less, and the second evaluation value decreasing as a position of the processing unit on the display screen is closer to the position of the first area, and the selecting of the enlargement area includes at least one of the second areas that includes processing units having a smallest sum of the evaluation values.

* * * * *